US010988873B2

(12) United States Patent
Tsai

(10) Patent No.: US 10,988,873 B2
(45) Date of Patent: Apr. 27, 2021

(54) FABRIC FILE RELEASE SYSTEM FOR AUTOMATICALLY CALIBRATING A CIRCULAR KNITTING MACHINE

(71) Applicant: PAI LUNG MACHINERY MILL CO., LTD., New Taipei (TW)

(72) Inventor: Hsien-Te Tsai, Taoyuan (TW)

(73) Assignee: Pai Lung Machinery Mill Co., Ltd., New Taipei (TW)

( * ) Notice: Subject to any disclaimer, the term of this patent is extended or adjusted under 35 U.S.C. 154(b) by 29 days.

(21) Appl. No.: 16/377,625

(22) Filed: Apr. 8, 2019

(65) Prior Publication Data

US 2020/0318269 A1 Oct. 8, 2020

(51) Int. Cl.
*D04B 15/66* (2006.01)

(52) U.S. Cl.
CPC .... *D04B 15/66* (2013.01); *G05B 2219/45194* (2013.01)

(58) Field of Classification Search
CPC ...... D04B 15/66; D04B 15/665; D04B 15/78; G05B 2219/45194
USPC .......................................................... 700/141
See application file for complete search history.

(56) References Cited

U.S. PATENT DOCUMENTS

| | | | | |
|---|---|---|---|---|
| 4,856,104 A * | 8/1989 | Stoll | ...................... | D04B 15/66 700/141 |
| 5,388,050 A * | 2/1995 | Inoue | ...................... | D04B 37/02 700/131 |
| 6,233,979 B1 * | 5/2001 | Plath | ...................... | D04B 9/025 66/232 |
| 6,301,938 B1 | 10/2001 | Takeuchi et al. | | |
| 6,338,002 B1 | 1/2002 | Kuo | | |
| 6,698,253 B2 * | 3/2004 | Stoll | ...................... | D04B 15/66 66/232 |
| 6,880,367 B2 * | 4/2005 | Suzuki | ................... | D04B 37/02 66/232 |
| 7,127,321 B2 * | 10/2006 | Kenji | ...................... | D04B 1/24 700/141 |
| 7,203,566 B2 * | 4/2007 | Terai | ...................... | D04B 37/02 66/232 |

(Continued)

FOREIGN PATENT DOCUMENTS

JP 2000256949 A 9/2000

*Primary Examiner* — Danny Worrell
(74) *Attorney, Agent, or Firm* — Muncy, Geissler, Olds & Lowe, P.C.

(57) ABSTRACT

A fabric file release system for automatically calibrating a circular knitting machine includes a file release end which memorizes a plurality of fabric file and a controlled terminal in information connection with the file release end. Each of the plurality of fabric file comprises a plurality of knitting machine working marks and a plurality of setting parameter values respectively corresponding to one of the knitting machine working marks. The controlled terminal comprises a setting file of knitting machine working including the plurality of knitting machine working marks and a plurality of working parameter values respectively corresponding to one of the knitting machine working marks. The controlled terminal receives one of the fabric file and maps the setting parameter values corresponding to each of the knitting machine working marks to the working parameter values corresponding to each of the knitting machine working marks in the setting file of knitting machine working.

7 Claims, 2 Drawing Sheets

(56) References Cited

U.S. PATENT DOCUMENTS

| 7,330,772 | B2 * | 2/2008 | Suzuki | D04B 37/02 |
|---|---|---|---|---|
| | | | | 700/139 |
| 8,506,303 | B1 * | 8/2013 | Smith | G09B 19/20 |
| | | | | 434/95 |

* cited by examiner

FABRIC FILE RELEASE SYSTEM FOR AUTOMATICALLY CALIBRATING A CIRCULAR KNITTING MACHINE

FIELD OF THE INVENTION

The present invention relates to a fabric file release system, and in particular to, a fabric file release system for automatically calibrating a circular knitting machine.

BACKGROUND OF THE INVENTION

Although the concept of automatic control has been around for a long time, however, it is still necessary to manually set each circular knitting machine before knitting new fabrics presently. The manufacturing time for new fabrics will be delayed if there is a large number of the circular knitting machines that need to be calibrated. Furthermore, in addition to a certain set time, a set value of manual calibration is more likely to be slightly different depending on different setters, which makes subsequent maintenance and calibration difficult.

Moreover, automatic control of the existing circular knitting machines has a remote abnormality elimination or automatic fine adjustment scheme, such as the technical solutions disclosed in U.S. Pat. Nos. 6,338,002, 6,301,938, and JPA 2000-256949. However, after inspection, the aforementioned patents only focus on the fine adjustment or abnormal elimination during the knitting process, and non-knitting initial setting.

SUMMARY OF THE INVENTION

A main objective of the present invention is to solve the problem that the conventional circular knitting machines cannot be automatically calibrated.

To achieve the foregoing objective, the present invention provides a fabric file release system for automatically calibrating a circular knitting machine, composed of a file release end and at least one controlled terminal. The file release end includes a file memorizing unit and a first communication module in information connection with the file memorizing unit. The file memorizing unit includes a plurality of fabric file respectively released by the first communication module. Each of the fabric file comprises a plurality of knitting machine working marks and a plurality of setting parameter values respectively corresponding to one of the knitting machine working marks. The controlled terminal is disposed on a circular knitting machine, and includes a second communication module in information connection with the first communication module for receiving one of the plurality of fabric file and a working management module connected to the second communication module. The working management module comprises a setting file of knitting machine working. The setting file of knitting machine working includes the plurality of knitting machine working marks and a plurality of working parameter values respectively corresponding to one of the knitting machine working marks. The working management module receives one of the fabric file from the second communication module, and maps the plurality of setting parameter values corresponding to each of the knitting machine working marks in the fabric file to the plurality of working parameter values corresponding to each of the knitting machine working marks in the setting file of knitting machine working. The plurality of working parameter values of the working management module control a plurality of members of the circular knitting machine to knit a fabric.

In one embodiment, the plurality of setting parameter values and the plurality of working parameter values are respectively character codes for representing numbers only.

In one embodiment, the plurality of knitting machine working marks are respectively selected from the group consisting of a rolling tension, a yarn feeding length, an upper cylinder stitch adjustment, a lower cylinder stitch adjustment, a weaving timing adjustment, a yarn feeding direction, an oil injection time, a clearing speed, an inching speed, an operating time, a time required for starting a knitting machine to a working speed, and a time required for stopping the knitting machine.

In one embodiment, the file release end is a cloud database, a server or a personal computer.

In one embodiment, the first communication module is in information connection with the second communication module by Internet, Bluetooth communication or near field communication.

In one embodiment, the plurality of members of the circular knitting machine are a plurality of motors respectively connected to the working management module.

In one embodiment, the plurality of motors are respectively selected from the group consisting of a stepping motor, a servo motor, a brushless DC motor, and a brushed DC motor.

Compared with the prior art, the foregoing disclosure of the present invention comprises the following characteristics: the present invention provides the standardized fabric file, so as to allow the controlled terminal on the circular knitting machine receiving the fabric file so that automatically calibrating the circular knitting machine for knitting a new fabric without format conversion.

DETAILED DESCRIPTION OF THE PREFERRED EMBODIMENTS

The detailed description and technical content of the present invention are described below with reference to the accompanying drawings.

Figure 1:
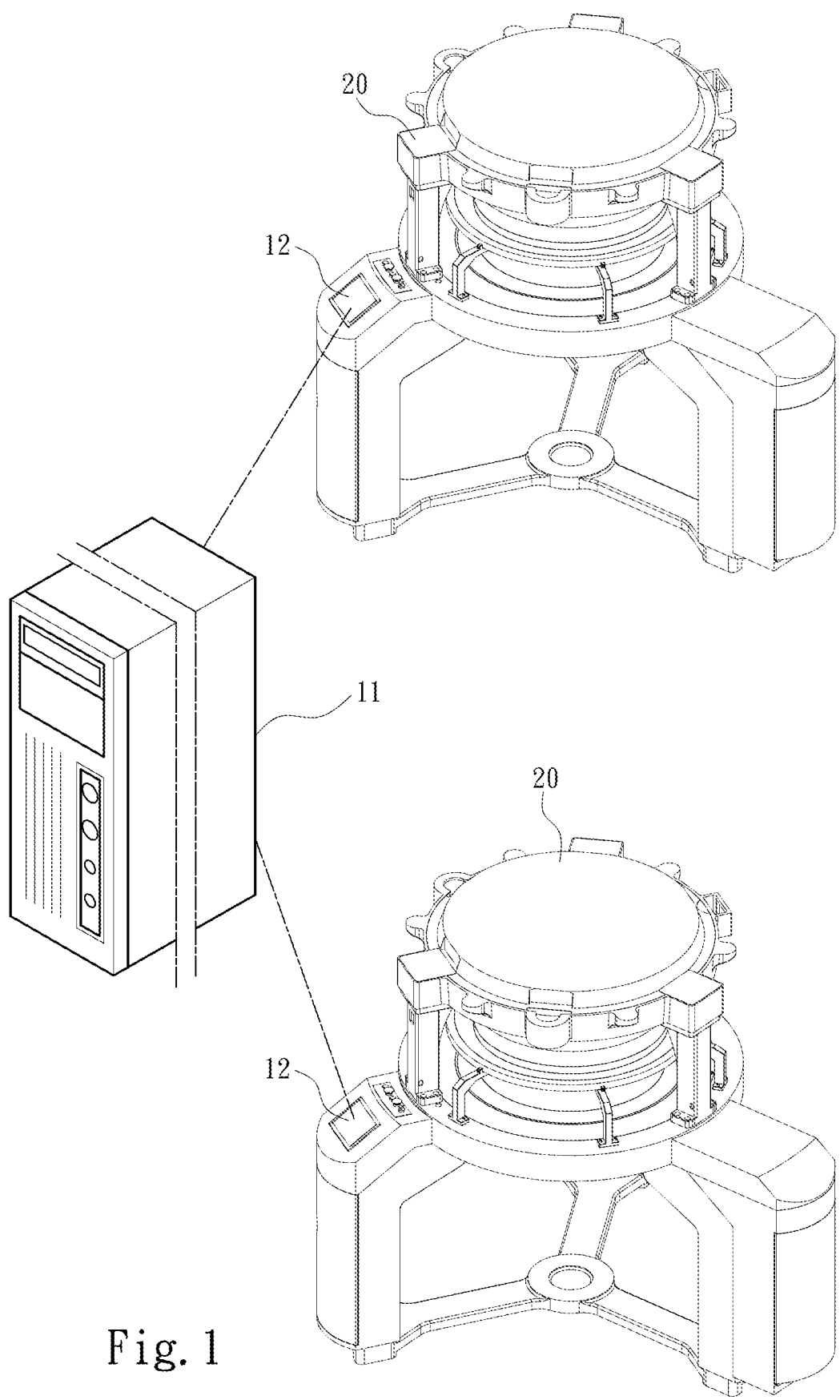
FIG. 1 schematically shows an implementation structure view of an embodiment of the present invention.
Figure 2:
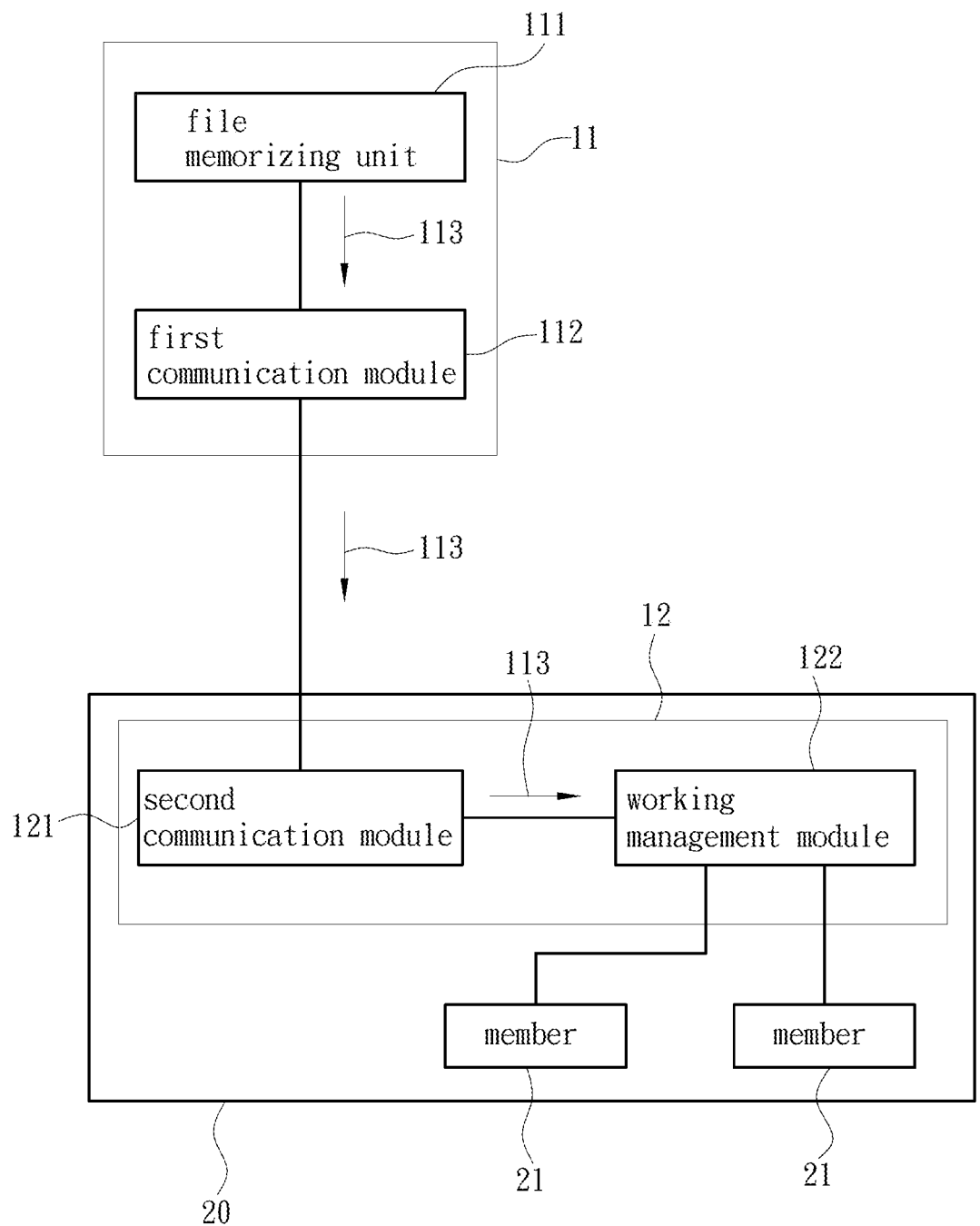
FIG. 2 schematically shows an implementation unit composition view of an embodiment of the present invention.

Referring to FIGS. 1 and 2, the present invention provides a fabric file release system for automatically calibrating a circular knitting machine. The fabric file release system is composed of a file release end 11 and at least one controlled terminal 12. Further, the file release end 11 is built by a fabric designer, a knitting machine manufacturer or a textile manufacturer. The file release end 11 is actually an electronic computing device, but may be a cloud database, a server or a personal computer. Further, the file release end 11 of the present invention includes a file memorizing unit 111 and a first communication module 112 in information connection with the file memorizing unit 111, wherein the file memorizing unit 111 is a device for storing digital file, such as a volatile memory, a non-volatile memory, a hard disk drive, or a solid state drive on the electronic computing device. In the present invention, the file memorizing unit 111 stores a plurality of fabric file 113 through the existing digital information writing method. Each of the plurality of fabric file 113 comprises a plurality of knitting machine working marks and a plurality of setting parameter values respectively corresponding to one of the knitting machine working marks. The plurality of knitting machine working marks are respectively selected from the group consisting of a rolling tension, a yarn feeding length, an upper cylinder adjustment, a lower cylinder adjustment, a weaving timing adjustment, a yarn feeding direction, an oil injection time, a clearing speed, an inching speed, an operating time, a time required for starting a knitting machine to a working speed, and a time required for stopping the knitting machine. Moreover, each of the plurality of setting parameter values of the present invention is a character code for representing numbers only, for example, an American Standard Code for Information Interchange (ASCII code) for representing numbers. Furthermore, the first communication module 112 may be implemented by Internet, Bluetooth communication, or near field communication (NFC) according to the embodiment.

Referring to FIG. 2, on the other hand, the controlled terminal 12 of the present invention is actually an electronic terminal equipment disposed on a circular knitting machine 20. The electronic terminal equipment is a controller of a plurality of members 21 on the circular knitting machine 20. The electronic terminal equipment may be a knitting machine controlling device. The plurality of members 21 may be a plurality of working modules or a plurality of motors disposed on the circular knitting machine 20, wherein the plurality of motors are respectively selected from the group consisting of a stepping motor, a servo motor, a brushless DC motor, a brushed DC motor, and a variable frequency motor. Moreover, the plurality of working modules are constituted by a plurality of components. The plurality of working modules may be a rolling control module, a yarn feeding module, a weaving timing adjustment mechanism or a stitch control module, etc. However, the foregoing is not intended to limit the types of the plurality of working modules. Hence, the controlled terminal 12 of the present invention includes a second communication module 121 and a working management module 122 connected to the second communication module 121, wherein the second communication module 121 may be implemented by the Internet, the Bluetooth communication, or the near field communication (NFC) according to the embodiment, the second communication module 121 is further implemented by using the same communication protocol with the first communication module 112, that is, when the second communication module 121 performs communication by the Internet, the first communication module 112 also implements communication by the Internet. Moreover, in addition to being connected to the second communication module 121, the working management module 122 is further connected to the plurality of members 21 to output working instructions to the plurality of members 21. Furthermore, the working management module 122 of the present invention further comprises a setting file of knitting machine working. The setting file of knitting machine working includes the plurality of knitting machine working marks and a plurality of working parameter values respectively corresponding to one of the knitting machine working marks, wherein each of the plurality of working parameter value is a character code for representing numbers only. Moreover, the setting file of knitting machine working is memorized in a storage element included by the working management module 122. The storage element may be a component for storing digital file, such as a volatile memory, a non-volatile memory, a hard disk drive, or a solid state drive. Furthermore, in the present invention, the fabric file 113 and the setting file of knitting machine working are implemented by the same code.

Hence, in the present invention, the controlled terminal 12 communicates with the file release end 11. The first communication module 112 of the file release end 11 releases one of the plurality of fabric file 113 to the controlled terminal 12. The second communication module 121 of the controlled terminal 12 receives the fabric file 113 released by the file release end 11. The second communication module 121 transfers the fabric file 113 to the working management module 122. The working management module 122 reads the fabric file 113 without any code conversion, and directly maps the plurality of setting parameter values corresponding to each of the knitting machine working marks in the fabric file 113 to the plurality of working parameter values corresponding to each of the knitting machine working marks in the setting file of knitting machine working. For example, one of the setting parameter values which is corresponding to the knitting machine working mark related to the yarn feeding length in the fabric file 113 is directly replacing one of the setting parameter value which is corresponding to the knitting machine working mark related to the yarn feeding length in of the setting file of knitting machine working. Accordingly, the working management module 122 enables the plurality of working parameter values to control the plurality of members 21 of the circular knitting machine 20 to knit a fabric.

Based on the foregoing, the present invention enables the circular knitting machine to achieve automatic calibration that the conventional circular knitting machine is still unable to do so, thereby eliminating the action for engineering personnel to independently calibrate each circular knitting machine, and shortening the overall working hours required for weaving a new fabric.

What is claimed is:

1. A fabric file release system for automatically calibrating a circular knitting machine, comprising:
   a file release terminal, comprising a file memorizing unit and a first communication module in information connection with the file memorizing unit, a plurality of fabric files read in the file memorizing unit and respectively transmitted by the first communication module, wherein each of the plurality of fabric file comprises a plurality of reference markers corresponding to works of the circular knitting machine and a plurality of setting parameter values in a character code form respectively corresponding to one of the reference markers; and
   at least one controlled terminal, disposed on the circular knitting machine, and comprising a second communication module in information connection with the first communication module and a management module connected to the second communication module, the second communication module receiving one of the plurality of fabric files transmitted from the first communication module, wherein the management module comprises a setting file to operate the works of the circular knitting machine, and the setting file comprises the plurality of reference markers and a plurality of operating parameter values in the character code form respectively corresponding to one of the reference markers;
   wherein the management module receives one of the plurality of fabric files from the second communication module, and the management module maps the plurality of setting parameter values corresponding to each of the reference markers in the fabric file to the plurality of operating parameter values corresponding to each of the reference markers in the setting file to control a plurality of members of the circular knitting machine knitting a fabric via the plurality of operating parameter values.

2. The fabric file release system for automatically calibrating a circular knitting machine according to claim 1, wherein the plurality of setting parameter values and the plurality of operating parameter values are respectively character codes for representing by numbers only.

3. The fabric file release system for automatically calibrating a circular knitting machine according to claim 1, wherein the plurality of reference markers are respectively selected from the group consisting of a rolling tension, a yarn feeding length, an upper cylinder stitch adjustment, a lower cylinder stitch adjustment, a weaving timing adjustment, a yarn feeding direction, an oil injection time, a clearing speed, an inching speed, an operating time, a time required for starting a knitting machine to a working speed, and a time required for stopping the knitting machine.

4. The fabric file release system for automatically calibrating a circular knitting machine according to claim 1, wherein the file release terminal is a cloud database, a server or a personal computer.

5. The fabric file release system for automatically calibrating a circular knitting machine according to claim 1, wherein the first communication module is in information connection with the second communication module by Internet, Bluetooth communication or near field communication.

6. The fabric file release system for automatically calibrating a circular knitting machine according to claim 1, wherein the plurality of members of the circular knitting machine are a plurality of motors respectively connected to the management module.

7. The fabric file release system for automatically calibrating a circular knitting machine according to claim 6, wherein the plurality of motors are respectively selected from the group consisting of a stepping motor, a servo motor, a brushless DC motor, a brushed DC motor, and a variable frequency motor.

* * * * *